United States Patent
Brehm et al.

(10) Patent No.: US 9,738,556 B2
(45) Date of Patent: Aug. 22, 2017

(54) METHOD AND DEVICE FOR PRODUCING ROD LENSES

(71) Applicant: j-plasma GmbH, Jena (DE)

(72) Inventors: Lothar Brehm, Jena (DE); Frank Coriand, Jena (DE); Wolfgang Schmidt, Jena (DE); Ulrich Strobel, Jena (DE)

(73) Assignee: J-PLASMA GMBH, Jena (DE)

( * ) Notice: Subject to any disclaimer, the term of this patent is extended or adjusted under 35 U.S.C. 154(b) by 0 days.

(21) Appl. No.: 14/938,069

(22) Filed: Nov. 11, 2015

(65) Prior Publication Data
US 2016/0060155 A1 Mar. 3, 2016

Related U.S. Application Data

(63) Continuation of application No. 13/721,609, filed on Dec. 20, 2012, now abandoned.

(30) Foreign Application Priority Data

Dec. 23, 2011 (DE) .................. 10 2011 122 184
Jan. 12, 2012 (DE) .................. 10 2012 000 418

(51) Int. Cl.
*C03B 37/018* (2006.01)
*C03B 19/14* (2006.01)

(52) U.S. Cl.
CPC .......... *C03B 19/14* (2013.01); *C03B 19/1407* (2013.01); *C03B 19/1415* (2013.01); *C03B 37/01884* (2013.01); *C03B 2201/21* (2013.01); *C03B 2201/23* (2013.01); *C03B 2207/66* (2013.01)

(58) Field of Classification Search
CPC .................... C03B 2201/21; C03B 2201/23
USPC ........................................... 65/17.4
See application file for complete search history.

(56) References Cited

U.S. PATENT DOCUMENTS

| 4,414,012 A | 11/1983 | Suto et al. |
| 4,421,540 A * | 12/1983 | Nakahara ............ C03B 37/0144 65/157 |
| 5,086,352 A * | 2/1992 | Yamagata ........... C03B 19/1423 252/588 |
| 5,668,067 A | 9/1997 | Araujo et al. |
| 5,908,482 A * | 6/1999 | Komine ............. C03B 19/1423 65/111 |

(Continued)

FOREIGN PATENT DOCUMENTS

| DE | 19960211 | 7/2001 |
| DE | 69613268 | 9/2001 |

(Continued)

*Primary Examiner* — Jason Lazorcik
(74) *Attorney, Agent, or Firm* — Brooks Kushman P.C.

(57) ABSTRACT

A method for producing rod lenses with an enveloping diameter of the rod lens face of up to 200 mm and an edge length of at least 800 mm. The method is characterized in that fabrication is performed from a cylindrical rod lens element made from synthetic quartz glass material configured as a fused silica ingot. This is performed using a flame hydrolysis method with a direct one stage deposition process of $SIO_x$ particles from a flame stream onto die that rotates and is moveable in a linear manner with respect to the flame stream.

21 Claims, 2 Drawing Sheets

(56) References Cited

U.S. PATENT DOCUMENTS

| | | | |
|---|---|---|---|
| 6,423,656 B1 * | 7/2002 | Coriand | C03B 19/1407 501/54 |
| 6,473,226 B1 * | 10/2002 | Jinbo | C03B 19/1407 359/355 |
| 6,518,210 B1 * | 2/2003 | Jinbo | C03B 19/1423 359/355 |
| 7,854,147 B2 | 12/2010 | Huenermann | |
| 2002/0144517 A1 * | 10/2002 | Fujiwara | C03B 19/1415 65/17.4 |
| 2007/0049482 A1 * | 3/2007 | Otsuka | C03B 19/1423 501/54 |
| 2008/0115533 A1 * | 5/2008 | Otsuka | C03B 19/14 65/17.4 |
| 2010/0167906 A1 * | 7/2010 | Ortmann | C03B 37/01406 501/53 |
| 2012/0213685 A1 * | 8/2012 | Morita | C03B 19/1453 423/335 |
| 2012/0291488 A1 * | 11/2012 | Ueda | C03B 19/1438 65/17.4 |

FOREIGN PATENT DOCUMENTS

| | | |
|---|---|---|
| DE | 102005043289 | 9/2006 |
| GB | 2083806 | 3/1982 |

\* cited by examiner

METHOD AND DEVICE FOR PRODUCING ROD LENSES

CROSS-REFERENCE TO RELATED APPLICATIONS

This application is a continuation of U.S. Ser. No. 13/721,609; filed Dec. 20, 2012 (pending) and claims priority to DE 10 2011 122 184.4, filed Dec. 23, 2011 and DE 10 2012 000 418.8, filed Jan. 12, 2012, the disclosures of which are incorporated in their entirety by reference herein.

TECHNICAL FIELD

The invention relates to a method for producing rod lenses with an enveloping diameter of the rod lens face of up to 200 mm and an edge length of at least 800 mm, using a flame hydrolysis method for producing a rod lens base element that is useable for producing the rod lens and a device for producing a rod lens base element.

BACKGROUND

Rod lenses are optical elements and devices that are formed from an elongated element that is transparent and in particular made from quartz glass. The element has the following typical geometric configuration: edge length (L)× height (H)×thickness (D), wherein the light entry and exits surfaces are defined by L×H and wherein the edge length (L) is many times greater than the height (H). When the edge dimensions (D) and (H) form the two legs of a right triangle, this yields the hypotenuse which simultaneously forms the diameter of the rod lens face. Depending on the application the light entry- and exit surfaces are formed as planar, convex or concave functional surfaces through classic optical processing in L-direction and also in H-direction. Rod lenses are used in display techniques, LED light source arrangements and optical imaging devices.

For producing a rod lens initially a rod lens base element is produced e.g. as a square rod which subsequently obtains the final shape of the rod lens through grinding and polishing processes. The rod lens element made from synthetic quartz glass or the rod lens produced therefrom has to have a high degree of optical homogeneity over its entire length. In particular they have to be free from bubbles, enclosures, layers and cords. Furthermore the quartz glass should have an OH content ≥1,000 ppm and a $H_2$ content $\geq 0.8 \times 10^{18}$ mol/cm$^3$.

In order to achieve these high optical requirements typically quartz glass from multi stage melting processes is being used. This means a prefabricated quartz glass element is finished through homogenization steps (DE 10 2005 043 289 B3) and/or additional loading of $H_2$ (DE 696 13 268 T3) in a complex manner. The quartz glass cylinders thus created have to be thermally formed in an additional process. This means the glass material is put into a mold that is made for example from graphite and subsequently brought to a softening- or flow temperature in a sinking kiln. The glass material thus sinks into the mold. For flat molds a glass surface (sinking block) is provided which is subsequently separated into particular rod lens elements. Due to the extreme rod lens geometry (L many times greater than H) multiple sinkings are required until the eventually desired shape of the rod lens element is achieved.

The sinking method recited supra requires precise control of a position of inhomogeneities within the glass cylinders. It has to be assured that inhomogeneities provided in the quartz glass cylinder, in particular possible layers do not change their orientations in the sinking processes so that the predetermined propagation direction of the light remains oriented perpendicular to these layers in the finished rod lens and does not influence the light propagation direction (D) of the rod lens over its entire edge length.

Through optical components that were newly introduced in recent years, in particular organic LEDs, so called OLEDs, rather long rod lenses are required that are relatively narrow relative to their height. These rod lenses have an edge length of approximately 800 mm and more. Furthermore the rod lenses which are exposed to intense laser irradiation have to have a florescence within the lens element that is as small as possible. In conjunction therewith a high degree of transmissivity of the lens element is required in the ultraviolet spectral range for various applications.

It is apparent that rod lenses with the required properties can only be produced through a sinking method in a very complex manner and only within a long production time. Thus, in particular precise control of uniform optical properties over the great length of the rod lens element causes problems. Through the high temperatures during the sinking process of 1700° C. or more quite frequently undesirable changes occur in the material properties of the glass materials. The contact with the graphite mold also induces uncontrolled property changes of the glass. Longer rod lens elements furthermore can only be produced in a multi stage process and thus in a time consuming manner. Furthermore complex finishing has to be performed upon the last sinking block which partially has to be performed with considerable material loses. Furthermore, the graphite molds have a finite service life and their manufacture is expensive. Additionally, the quality of the glass material and the successful execution of the sinking method can eventually only be checked at the finished rod lens.

SUMMARY

Thus, it is an object of the invention to provide a method for producing rod lenses through which it is facilitated to produce rod lenses, in particular with greater edge length of at least 800 mm in a cost effective manner and with significantly reduced production time, wherein the rod lens that are produced shall have advantageous optical properties when loaded with intense laser radiation.

The object is achieved through a method for producing rod lenses with an enveloping diameter of the rod lens face of up to 200 mm and an edge length of at least 800 mm according to the teachings of claim 1. The object is furthermore achieved through the features of method claim 4 and through a device with the features of claim 5.

The method according to claim 1 is characterized according to the invention in that a rod lens base element made from a synthetic quartz glass material in the form of a fused silica ingots is produced using a flame hydrolysis method. Thereafter a direct single stage deposition process of $SIO_X$ particles from a flame flow is provided to a rotating and moveable die.

A method of this type is already known from producing comparatively short and thick quartz glass cylinders and similar semi finished products. They are preferably finished into optical wafers and lithographic components, wherein in particular an immaculate and defined material structure is defined along the optical functional direction of the semi finished product or the optical component is important.

Surprisingly it has become apparent that rod lens base element with the recited length and thickness can be produced using the flame hydrolysis method, wherein it is apparent in particular that the obtained rod lens elements are free from inhomogeneities not only over their cross sections, but additionally over their entire lengths. This was not to be expected so far because the flame hydrolysis method does not relate to producing semi finished products that are free from inhomogeneities in longitudinal direction and is therefore not used either for producing long rod lens elements. However, in particular the rather long rod lens elements produced through this method have proven to be excellent base materials for further processing into finished rod lenses. This is important in particular because the method facilitates producing rod lens elements with excellent optical properties with comparatively large edge length with respect to the previously used sinking method in a rather short time in a continuous process, thus quasi on a conveyor belt in an exact manner.

In an advantageous embodiment of the method the synthetic quartz glass deposited in the deposition process has an OH-content of more than 1,000 ppm. Thus, it is a synthetic quartz glass with a comparatively high content of OH groups and hydrogen in which laser induced florescence is suppressed.

In another embodiment the method is performed so that the synthetic quartz glass deposited in the deposition process has a maximum transmissivity for ultraviolet radiation in the wave length range of approximately 193-400 nm.

Another aspect of the invention includes using a flame hydrolysis method with a direct single stage deposition process of $SiO_x$ particles from a flame stream onto a rotating and moveable die for producing a rod lens element for producing a rod lens.

In a device for producing a rod lens element with an enveloping diameter of the rod lens face of up to 200 mm and an edge length of at least 800 mm a muffle kiln with a multi shell tubular or tunnel shaped muffle is provided with a burner inserted from a first side into the muffle with a supply for a silicon containing reaction agent and a moveable die that is arranged opposite to the burner. The device is characterized in that the muffle has a muffle geometry with a distance between the enveloping surface of a formed FS ingot and an inner wall of the muffle in a range of 40-75 mm and a distance between the muffle and the melting surface of the FS ingot between 10 and 25 mm and the muffle has a vent air controlled kiln temperature of 1,100 to 1,300° C.

In another embodiment the muffle includes a temperature stabilizing lateral oven extension with a length of at least 50 mm.

BRIEF DESCRIPTION OF THE DRAWINGS

The invention is subsequently described in more detail based on an embodiment. FIGS. 1 and 2 are being used for further illustration. Identical reference numerals are being used in the figures for identical or equivalent components wherein:

FIG. 1 illustrates a basic muffle configuration; and
FIG. 2 illustrates an oven extension.

DETAILED DESCRIPTION

Figure 1:
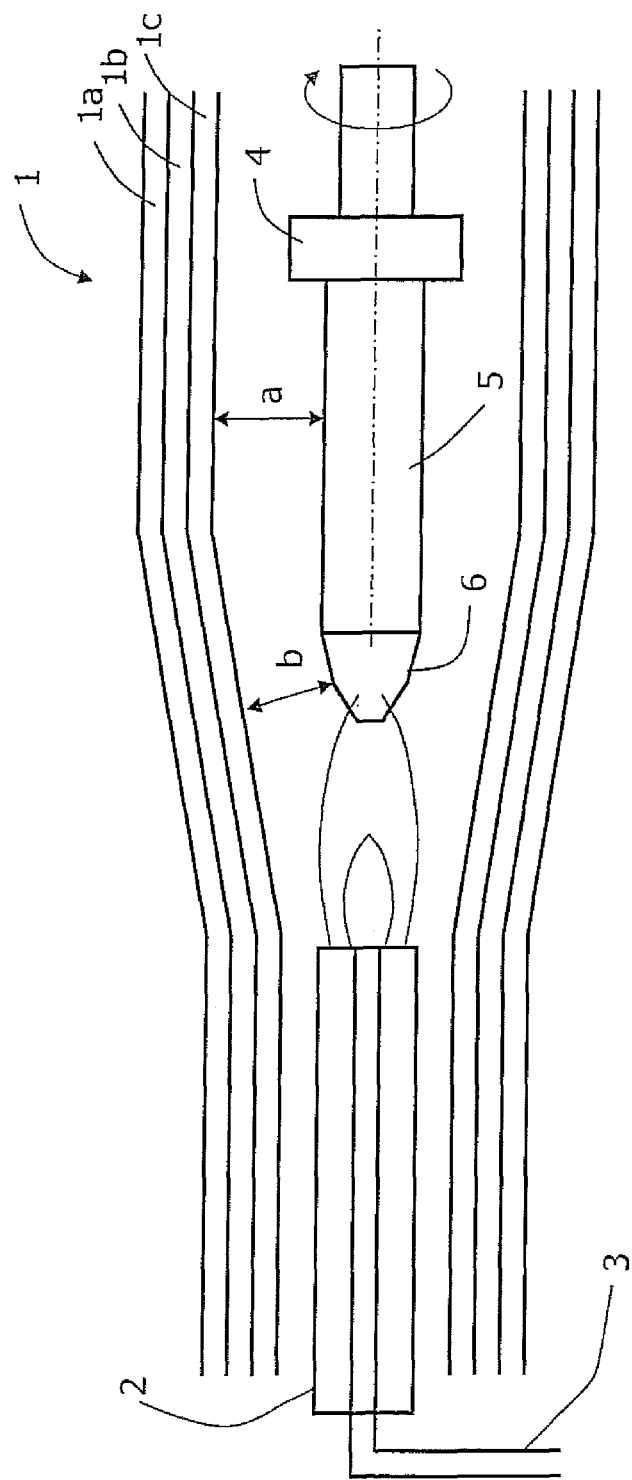

The proposed flame hydrolysis method is performed in a muffle oven. The muffle oven includes a configuration that is known for ovens of this type. It is made from a tubular or tunnel shaped muffle 1 in which the deposition process is performed. Preferably the muffle has a multi shell wall configuration from a porous heat insulating material 1 a, in particular a fibrous and/or ceramic material, a concrete- or fire brick wall 1b and an inner fairing 1c made from a material that is sufficiently resistant with respect to high temperatures in particular aluminum oxide or silicon carbide.

The muffle 1 has respective openings at its ends. One of the two openings is used for inserting a die 4. The opposite opening includes a burner 2 inserted therein which can also be configured with plural flames. The burner 2 is configured with a feed line 3 for a reactant that includes silicon which is introduced in gaseous form into the burner portion and oxidized into silicon oxide $SiO_x$. The silicon oxide particles thus formed are driven in the flame stream towards the die 4 and deposit on the die. The die 4 is rotatably supported, so that an even coverage of the die surface is provided with the particle flow. This forms a growing layer of synthetically generated quartz glass in the form of a fused silica ingot (FS-ingot) 5 on the surface of the die 4.

The process is run so that the distance between the flame portions of the burner 2 and the surface of the forming quartz glass layer is substantially maintained constant. Thus, the die 4 is pulled back with a continuous speed so that a quartz glass cylinder or the FS-ingot 5 forms with an increasing length on the die 4. It represents the forming rod lens base element which can be removed, cooled tested and subsequently be directly used as a semi finished product for producing one or plural rod lenses immediately after the deposition process is completed.

The method provides high temperature uniformity over the entire deposition process and for large portions of the rod lens element. A melting length that is as long as possible in the FS ingot is important, wherein inhomogeneitites can be effectively prevented in longitudinal direction of the FS-Ingot. Kiln temperatures in a range of 1,100-1,300° C. have proven advantageous, wherein the temperature is controlled through adjustment and monitoring of the exhaust air temperature. Thus an exhaust air temperature of 230-270° C. has proven useful.

The distance b between the muffle inner wall and the melting surface of the deposited FS-ingot is preferably kept constant through a light beam monitoring. Distances of 10-25 mm have proven useful.

Adjusting and preselecting a reproducible reaction cavity volume between the forming FS ingot and the muffle inside is advantageous. Herein respective different muffle geometries are used which provide a distance a between the enveloping surface of the FS-ingot and the muffle inner wall in a range of 40-75 mm.

Figure 2:
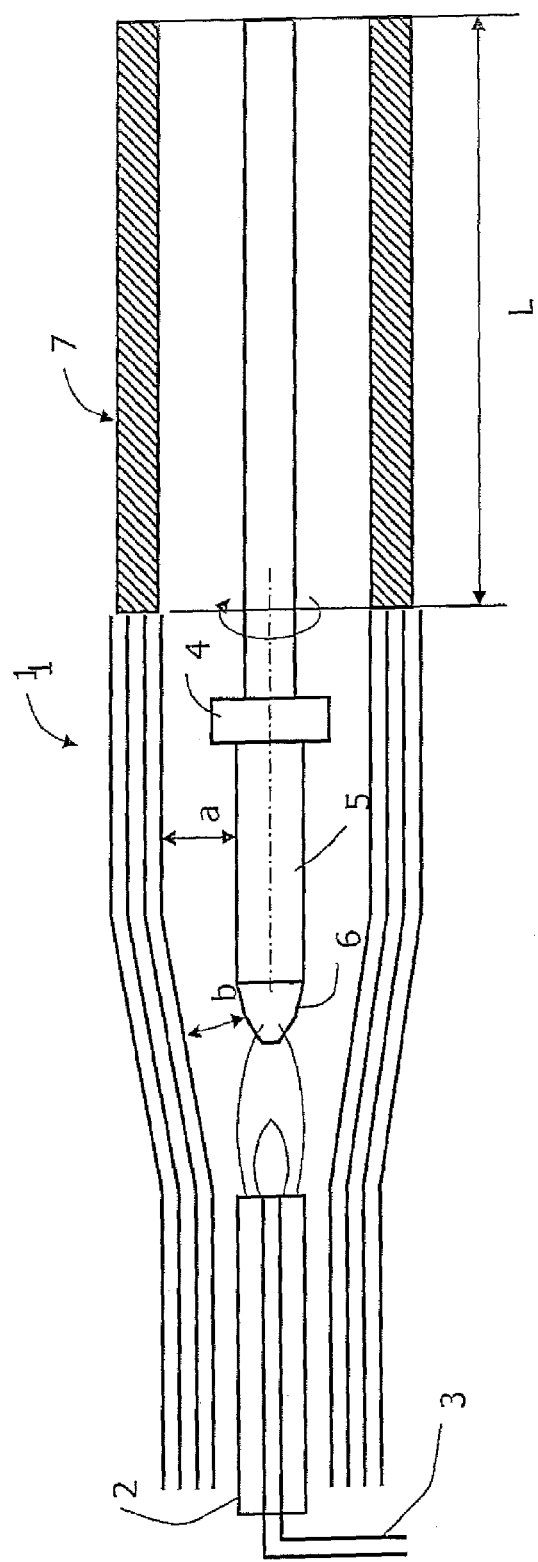

In this context an adapted and variably configured extension 7 of the oven cavity is advantageous which laterally connects to the actual muffle 1. An oven extension of this type is illustrated in FIG. 2. The oven extension additionally contributes to temperature consistency in the muffle cavity. The extension includes for example a length L of approximately 50-250 mm.

It has become apparent that the method recited supra facilitates in particular producing rod length elements with a large ratio between edge length and height/thickness. Typical lengths of the rod length element are at least at 800 mm and can be 1500 mm and more without problems. Thus, the edge length L is many times greater than the height H or the thickness D for comparatively normal rod lenses.

The synthetic quartz glass of the finished rod lens element is completely homogenous over its entire length without bubbles, layers, inclusions and cords. It includes a high content of OH groups of at least 1,000 ppm, in particular 1,200 ppm and more. The content of molecular hydrogen $H_2$ is above $0.8 \times 10^{18}$ molecules per cm$^3$, typically $1.2 \times 10^{18}$ molecules per cm$^3$. The value of the stress double refraction is less than 5 nm/cm and is typically below 3 nm/cm. In axial direction a high refractive index homogeneity with a deviation of $4 \times 10^{-6}$ and less is achieved. The glass material has a maximum transmissivity for light in the ultra violet spectral range, this means in a range of 193 to 400 nm over its entire length. Simultaneously this suppresses undesirable fluorescences under the influence of irradiated laser light in the finished rod lens.

Without any problem two or plural rod lenses can be produces from a quartz glass cylinder (rod lens base element) which are essential identical with respect to their material properties irrespective from which section of the original cylinder the eventually provided rod lens has been cut.

The invention was described based on exemplary embodiments. Other embodiments will be apparent to a person skilled in the art and can also be derived from the dependent claims.

| REFERENCE NUMERALS AND DESIGNATIONS | |
| --- | --- |
| 1 | muffle |
| 1a | heat insulating material |
| 1b | concrete or fire brick wall |
| 1c | inner fairing |
| 2 | burner |
| 3 | feed line for reactive agent |
| 4 | die |
| 5 | FS-Ingot |
| 6 | melting surface |
| 7 | oven cavity extension |
| a | distance enveloping surface FS-ingot to muffle inner wall |
| b | distance melting surface to muffle inner wall |
| L | length of kiln cavity extension |

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for producing rod lenses with an enveloping diameter of a rod lens face of up to 200 mm and an edge length of at least 800 mm, comprising directly fabricating the rod lenses from a cylindrical fused silica ingot element prepared by generating synthetic quartz glass material SiO$_x$ particles in a flame hydrolysis nozzle and depositing the particles onto a rotating die in a direct, one-stage deposition process, and moving the rotating die away from the flame hydrolysis nozzle in a linear fashion with respect to a flame stream from the nozzle such that the distance from the flame of the flame stream and a surface of a forming silica glass layer on the ingot remains constant, wherein the fused silica ingot is free of bubbles, layers, inclusions, and cords over the edge length of the rod lens.

2. The method of claim 1, wherein the synthetic quartz glass material deposited in the deposition process has an OH content of more than 1,000 ppm and/or a H$_2$ content of more than $0.8 \times 10^{18}$ molecules/cm$^3$.

3. The method of claim 1, wherein the synthetic quartz glass material deposited in the deposition process has an OH content of more than 1,200 ppm and an H$_2$ content of more than $0.8 \times 10^{18}$ molecules/cm$^3$.

4. The method of claim 3, wherein the H$_2$ content is about $1.2 \times 10^{18}$ molecules/cm$^3$.

5. The method of claim 1, wherein the synthetic quartz glass material deposited in the deposition process has maximum transmissivity for ultraviolet radiation in the wave length range of 193-400 nm.

6. The method of claim 1, wherein the fused silica ingot element has a high axial refractive index homogeneity with a refractive index deviation of $4 \cdot 10^{-6}$ or less, measured directly after preparation of the fused silica ingot element.

7. The method of claim 1, wherein the synthetic glass material deposited in the deposition process has a value of stress double refraction of less than 5 nm/cm.

8. The method of claim 1, wherein the synthetic glass material deposited in the deposition process has a value of stress double refraction of less than 3 nm/cm.

9. The method of claim 1, wherein the rod lens edge length is ≥1500 mm.

10. The method of claim 1, wherein the fused silica ingot element is prepared in a muffle furnace, with an internal temperature of 1100° C. to 1300° C.

11. The method of claim 10, wherein the internal temperature is maintained by monitoring and adjusting the temperature of an exhaust gas exiting the muffle furnace.

12. The method of claim 10, wherein a distance between an inner wall of the muffle furnace and an enveloping lateral surface of the cylindrical rod element is from 40-75 mm.

13. The method of claim 10, wherein a distance from an inner wall of the muffle furnace and a melting surface of the cylindrical rod element is from 10-25 mm.

14. A method for producing a cylindrical rod ingot suitable for directly producing a rod lens, comprising generating synthetic quartz glass material SiO$_x$ particles in a flame hydrolysis nozzle and depositing the particles onto a rotating die in a direct, one-stage deposition process, and moving the rotating die away from the flame hydrolysis nozzle in a linear fashion with respect to a flame stream from the nozzle such that the distance from the flame of the flame stream and a surface of a forming silica glass layer on the ingot remains constant, wherein the cylindrical rod element is free of bubbles, layers, inclusions, and cords over a length of at least 800 mm.

15. The method of claim 14, wherein the synthetic quartz glass material amount deposited in the deposition process has maximum transmissivity for ultraviolet radiation in the wave length range of 193-400 nm.

16. The method of claim 14, wherein the method takes place in a muffle furnace, with an internal temperature of 1100° C. to 1300° C.

17. The method of claim 16, wherein the internal temperature of the muffle furnace is maintained by monitoring and adjusting the temperature of an exhaust gas exiting the muffle furnace.

18. The method of claim 16, wherein a distance between an inner wall of the muffle furnace and an enveloping lateral surface of the cylindrical rod element is from 40-75 mm.

19. The method of claim 16, wherein a distance from an inner wall of the muffle furnace and a melting surface of the cylindrical rod element is from 10-25 mm.

20. The method of claim 13, wherein an extension is laterally connected to an end muffle furnace remote from the flame hydrolysis nozzle, the extension having a length of at least 50 mm.

21. A method for producing rod lenses with an enveloping diameter of a rod lens face of up to 200 mm and an edge length of at least 800 mm, comprising:

- directly fabricating the rod lenses from a cylindrical fused silica ingot element prepared by generating synthetic quartz glass material $SiO_x$ particles in a flame hydrolysis nozzle and depositing the particles onto a rotating die in a muffle oven in a direct, one-stage deposition process;
- providing a uniform muffle oven temperature of 1000° C. to 1300° C. during the deposition process;
- keeping a constant distance between a melting surface of the deposited fused silica ingot and an inner wall of the muffle oven; and
- moving the rotating die away from the flame hydrolysis nozzle in a linear fashion with respect to a flame stream from the nozzle such that the distance from the flame of the flame stream and a surface of a forming silica glass layer on the ingot remains constant, wherein the fused silica ingot is free of bubbles, layers, inclusions, and cords over the edge length of the rod lens.

* * * * *